(12) United States Patent
Satsangi et al.

(10) Patent No.: US 8,286,011 B2
(45) Date of Patent: Oct. 9, 2012

(54) METHOD OF WAKING PROCESSOR FROM SLEEP MODE

(75) Inventors: Mohit Satsangi, Noida (IN); E. S. Kalyana Chakravarthy, Noida (IN); Benjamin C. Eckermann, Austin, TX (US); Gregory B. Shippen, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 277 days.

(21) Appl. No.: 12/714,526

(22) Filed: Feb. 28, 2010

(65) Prior Publication Data

US 2011/0213992 A1    Sep. 1, 2011

(51) Int. Cl.
*G06F 1/00*      (2006.01)
*G06F 1/32*      (2006.01)
(52) U.S. Cl. .................................................. 713/300
(58) Field of Classification Search .............. 713/320, 713/300, 323
See application file for complete search history.

(56) References Cited

U.S. PATENT DOCUMENTS

| 5,802,305 | A  | * | 9/1998  | McKaughan et al. ........ 709/227 |
| 6,463,542 | B1 |   | 10/2002 | Yu |
| 6,782,484 | B2 |   | 8/2004  | McGowan |
| 7,127,521 | B2 |   | 10/2006 | Hsu |
| 7,327,754 | B2 |   | 2/2008  | Mills |
| 7,603,574 | B1 | * | 10/2009 | Gyugyi et al. ............... 713/300 |
| 2003/0061426 | A1 | * | 3/2003 | Connor ......................... 710/265 |
| 2003/0191854 | A1 |   | 10/2003 | Hsu et al. |
| 2003/0226046 | A1 | * | 12/2003 | John ............................. 713/300 |
| 2004/0196789 | A1 | * | 10/2004 | Keirouz et al. ............... 370/230 |
| 2004/0264396 | A1 | * | 12/2004 | Ginzburg et al. ............. 370/311 |
| 2007/0238437 | A1 | * | 10/2007 | Jaakkola ..................... 455/343.1 |

OTHER PUBLICATIONS

"Newest Freescale QorIQ processor delivers performance and energy efficiency for green embedded applications", Electronic Specifier, http://www.electronicspecifier.com, Sep. 9, 2009.
"P1022 Product Summary p.", www.freescale.com/webapp/sps/site/prod_summary.jsp?code=P1022, downloaded on Feb. 11, 2010.
"Advanced PowerQUICC III SoC from Freescale sets new standards for energy efficiency in embedded processing", Power.ORG, http://www.power.org, Sep. 10, 2008.

* cited by examiner

*Primary Examiner* — Thomas Lee
*Assistant Examiner* — Terrell Johnson
(74) *Attorney, Agent, or Firm* — Charles Bergere

(57) ABSTRACT

A method and apparatus for storing and classifying packets transmitted over a network to a processor in a low power mode. The processor receives and classifies the packets as interesting or not interesting. Uninteresting packets are discarded while interesting packets are stored in memory. For the first interesting packet received, a receive timer is activated and for every interesting packet received a counter is incremented. A transmit timer is activated when the processor enters the low power mode. When either the receive timer expires, the transmit timer expires or the counter reaches a threshold value then a wake-up interrupt is asserted.

16 Claims, 3 Drawing Sheets

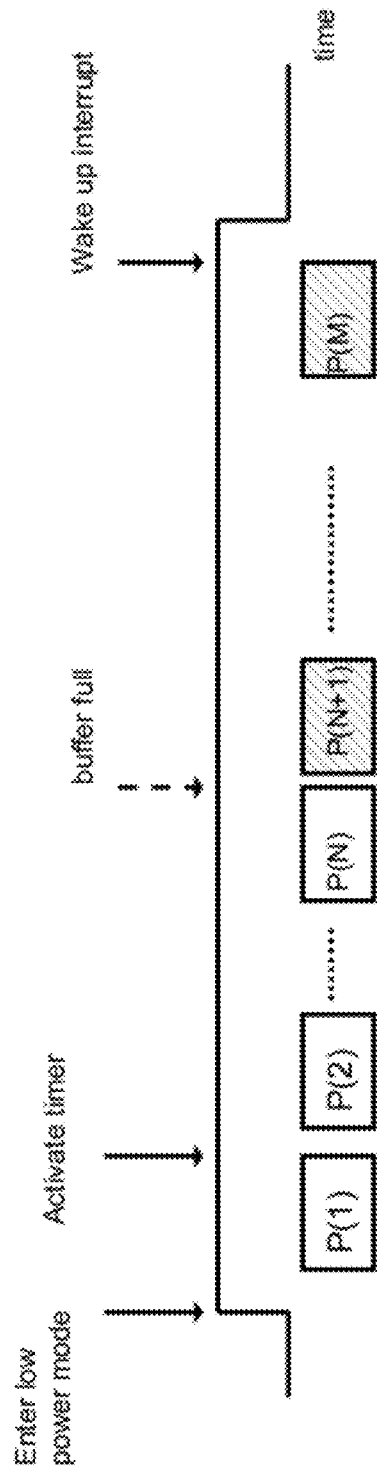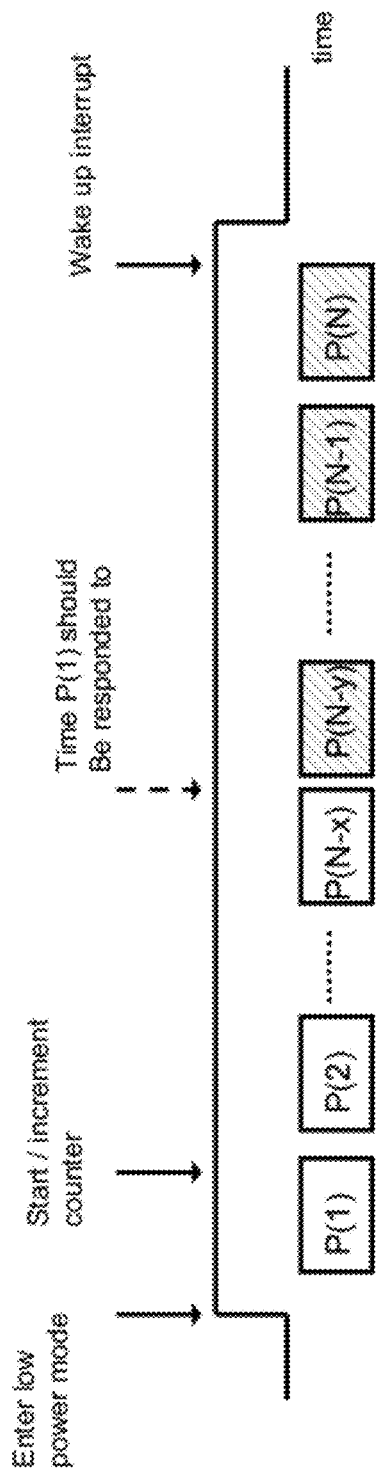
FIG. 3A
FIG. 3B

METHOD OF WAKING PROCESSOR FROM SLEEP MODE

BACKGROUND OF THE INVENTION

The present invention relates to electronic devices that have power saving modes of operation and, more particularly, to waking up a processor from a deep sleep mode.

There is a great demand for high (gigahertz) performance from embedded processors that include so called "green" technology or power management and energy saving features. For example, printers and other office automation equipment (i.e., peripheral devices) that have cyclical workloads usually include a sleep or hibernate mode in which the device is powered down when not used for a predetermined time period. The device is awakened when a power or other button is pressed. While such a scheme provides great power savings, this scheme needs to be modified when applied to processors or systems that are connected to a network because network transmissions must be constantly analyzed by the device to determine whether or not it must act on such transmissions. Further, processors cannot afford the time it takes to wake up from a full power down state or they may lose data that is being transmitted to them. Thus, processors now allow for varying levels of power down, which may be called sleep mode, deep sleep mode, and the like.

Processors connected to a network include a network interface circuit or network interface card. When in a sleep mode, the processor and other modules may be powered down but the network interface circuit remains active so that data packets can be received and analyzed. If an interesting packet is received, then the network interface circuit sends a signal or interrupt to the processor to awaken it, otherwise the packet is discarded.

An improvement to this scheme is to connect a memory or buffer to the network interface circuit and buffer the packets that arrive after receipt of an interesting packet so that data is not lost while the processor is transitioning from the sleep mode. However, data may be lost if the size of the buffer is not adequate or the processor cannot transition quickly from the sleep mode. Thus, a further improvement is to slow down the speed of the network when the processor is sleeping or waking up, which decreases the number of packets that will be received and must be stored in the buffer.

The above described approaches still fall short of optimal power reduction because they either require a large buffer so as not to lose data (a larger buffer consumes more power) and because the processor usually does not remain in the sleep mode very long before it is interrupted due to receipt of an interesting data packet. That is, the average standby time is low because the device frequently wakes up. Accordingly, it would be advantageous to have a processor that provides for additional energy savings.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIGS. 3A and 3B are timing diagrams illustrating data packet reception by a processor in low power mode.

DETAILED DESCRIPTION OF THE INVENTION

Figure 1:
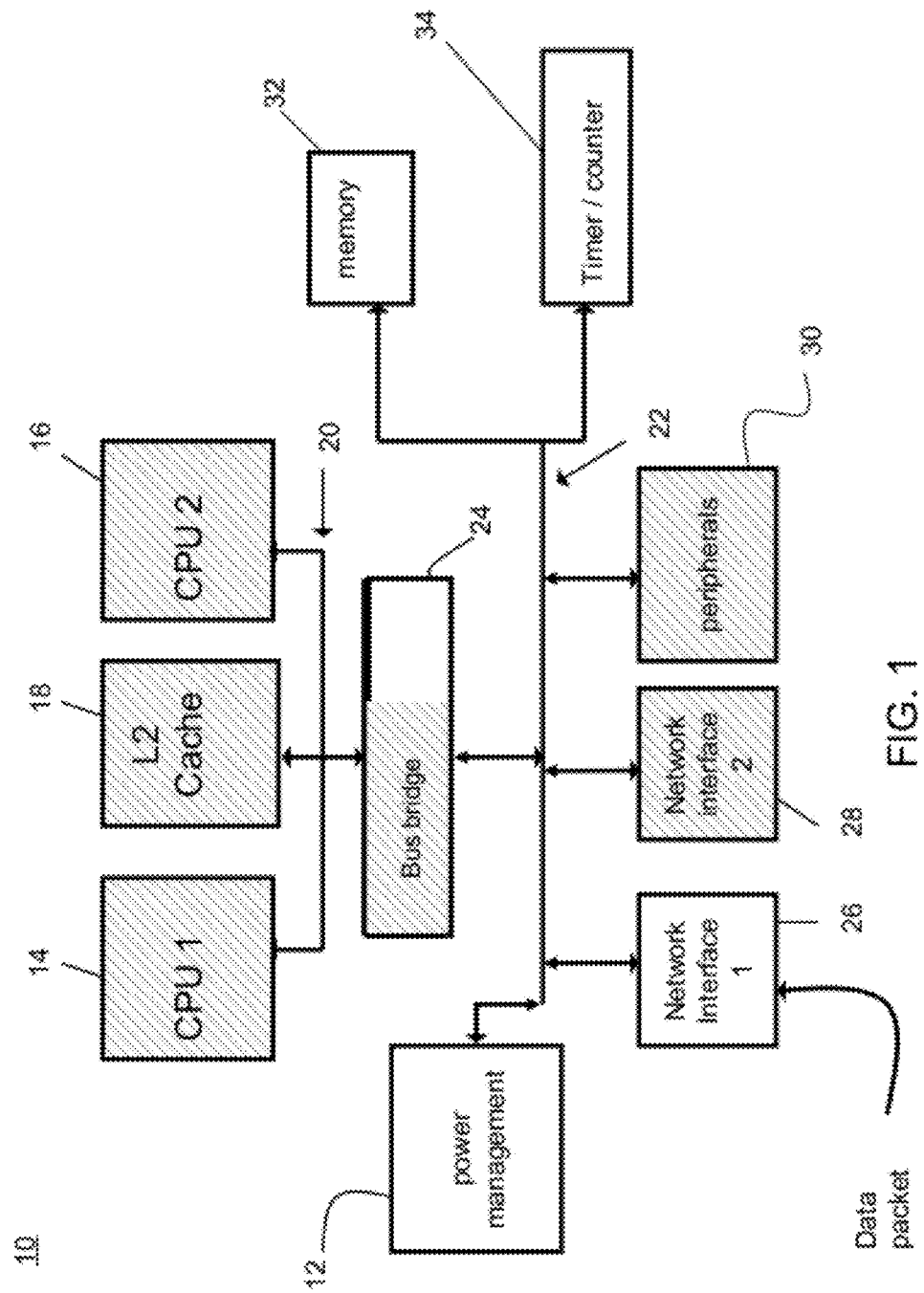
FIG. 1 is a schematic block diagram of a processor in accordance with an embodiment of the present invention.

In one embodiment, the present invention provides a processor that includes at least an active mode and a sleep mode. The processor is connectable to a network for receiving packets of data transmitted over the network. The processor includes at least one processing unit that is powered down when the processor is in the sleep mode. A network interface circuit that is connectable to a network is coupled to the processing unit by way of a system bus. A memory, such as a double data rate (DDR) memory is coupled to the network interface circuit by way of the system bus. The processor also includes a timer and a counter. The network interface circuit receives data packets transmitted over the network and classifies the received packets. The received packets may be classified as interesting, not interesting, or immediately interesting. Packets classified as interesting are stored in the memory. For the first interesting packet detected, a timer is initiated, and whenever an interesting packet is sent to the memory the counter is incremented. When either the timer reaches a certain time or expires as the case may be, or the counter reaches a certain value, then a wake-up interrupt is generated to wake-up the processing unit. Packets classified as immediately interesting also are stored in the memory, but when an immediately interesting packet is detected, the wake-up interrupt is asserted to wake-up the processing unit (as well as other components of the processor not specifically discussed herein). Packets classified as uninteresting may be discarded.

Although the processor is described in terms of the active and sleep modes, in fact the processor may have various different sleep modes in which more or fewer components or circuits of the processor are either powered down or supplied with a lower operating voltage than other components or circuits of the processor. Those of skill in the art should readily understand these facets of the processor. Thus, as used herein, the terms sleep, deep sleep, low power, ultra-low power, hibernate and the like may be referred to as just low power mode or sleep mode.

In another embodiment, the present invention provides a method of waking a processor connected to a network from a sleep mode. The method includes receiving a packet via a network connection and classifying the packet in accordance with predetermined categories, including interesting and not interesting. If the received packet is classified as interesting it is stored in a memory, a counter is incremented, and if this is the first interesting packet, then a timer is initiated. When either the timer or the counter reaches a predetermined time or count, respectively, a wake-up interrupt is asserted to wake-up the processor from the deep sleep mode.

As used in the written description that follows, the term "bus" is used to refer to a plurality of signals that may be used to transfer one or more various types of information, such as data, addresses, control, or status. The signals may be illustrated or described in reference to being a single signal a plurality of signals, unidirectional signals, or bidirectional signals. However, different embodiments may vary the implementation of the bus. The terms "assert" or "set" and "negate" (or "deassert" or "clear") may be used herein when referring to the rendering of a signal, status bit, or the like into its logically true or logically false state, respectively. If the logically true state is a logic level one, the logically false state is a logic level zero and vice-versa. Each signal described herein may be designed as positive or negative logic, where negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals. The term "coupled," as used herein, is not intended to be limited to a direct coupling, a mechanical coupling, or a direct electrical connection only.

The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Because the apparatus implementing the present invention is, for the most part, composed of electronic components and circuits known to those skilled in the art, circuit details will not be explained in any greater extent than that considered necessary for the understanding and appreciation of the underlying concepts of the present invention and in order not to obfuscate or distract from the teachings of the present invention.

Some of the embodiments may be implemented using a variety of different computer systems. For example, although FIG. 1 and the discussion thereof describe an exemplary processor, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Also, although the processor (described below) is preferably a System on a Chip (SoC), various elements of the processor could be formed on separate chips. Also for example, portions of the processor may be implemented in software or firmware or code representations of physical circuitry or of logical representations convertible into physical circuitry. As such, the processor may be embodied in a hardware description language of any appropriate type.

Further, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Referring now to FIG. 1, a schematic high level block diagram of a processor 10 connectable to a network such as an Ethernet network for receiving packets of data transmitted over the network is shown. The processor 10 includes a power management circuit 12 that allows power to be turned off on other areas (components) of the device when those components are not in use. The processor 10 also includes at least one processing unit or CPU 14, although in the embodiment shown, the processor 10 includes a second CPU 16. The CPUs 14 and 16 are coupled to each other and in the embodiment shown to a cache memory 18 (e.g., a level 2 cache) via an inter-processor bus 20.

The processor 10 also includes a system bus 22 connected to the inter-processor bus 20 via a bus bridge 24. A plurality of modules may be coupled to the system bus 22 such as first and second network interface circuits 26 and 28, labeled as Ethernet 1 and Ethernet 2, one or more additional interface circuits 30, a memory 32 and a timer and counter circuit 34. The additional interface circuits 30 may include on-chip networking logic, a hard-disk controller, USB (Universal Serial Bus) ports, a GPIO (General Purpose I/O), etc. In one embodiment, the memory 32 is a double data rate (DDR) type memory. The timer and counter circuit 34, although shown as a separate logic block may be part of the interface circuits 26, 28 or the other peripherals 30. All of the components shown may be formed on a single die and form a so-called System on a Chip (SoC). All of the components and the SoC are generally known and commercially available. Thus, those details of the components not pertinent to the understanding of the present invention will not be described in detail so as not to obfuscate the present invention. An example of such a commercially available processor is the MPC8536E PowerQUICC III processor, which is commercially available from Freescale Semiconductor, Inc., the assignee of this application.

In order to conserve power, the processor 10 and specifically the power management circuit 12 monitor the usage of the processor components and supply power as needed to those components. For example, a normal operating voltage is provided to all of the components when the processor 10 has a heavy workload, while when the workload is lighter the clock frequency may be changed to reduce dynamic power consumption. When at least one of the CPUs 14 and 16 is being provided with power and in operation, this is referred to herein as an active mode. Further, as used herein sleep mode refers to the state of the processor 10 when the CPUs 14 and 16 and the cache 18 are turned off. However, during sleep mode, other components of the processor 10, such as the second network interface circuit 28, the additional interface circuits 30, and portions of the bus bridge 24 also may be turned off.

As discussed in the Background of the Invention, it is known that a network interface circuit of a processor can receive data packets while other components of the processor are asleep and wake-up the sleeping components when an interesting data packet has been received. In the prior art, the processor is transitioned from sleep mode to active mode as soon as the interesting packet is received, and a small buffer memory may be provided to store packets received during the transition from sleep to wake. However, some packets received by a sleeping processor need not be processed immediately, so the present invention allows such packets to be stored without waking the other components of the processor until necessary. This prevents constant movement between the sleep and active modes and allows the processor to remain asleep longer and thus conserve more power.

In FIG. 1, the shaded components may be turned off during sleep mode and the unshaded components remain on. The first network interface circuit 26, which remains on when the processor 10 is in the sleep mode, receives packets transmitted over a network, such as Ethernet data packets. The first network interface circuit 26 classifies the packets as interesting, not interesting, or immediate wake-up. An example of an immediate wake-up would be a print job sent to a printer controlled by an embedded processor such as the processor 10. Another example would be when a TCP packet with its SYN bit set to '1' (new connection) is received. The wake up interrupt is generated after the packet is stored in the memory 32.

If an immediate wake-up packet is received, a wake-up interrupt is asserted, causing the processor to transition from the sleep mode to the active mode.

On the other hand, if an uninteresting packet is received, that packet may be discarded or ignored.

If an interesting packet is received, according to the present invention, it is stored in a memory, such as the memory 32. The data packet is received at the network interface circuit 26 and transmitted to the memory 32 by way of the system bus 22. Although most of the modules of the processor 10 are asleep, the bus bridge 24 or a portion thereof remains awake to allow data to be transmitted over the system bus 22 to the memory 32. In one embodiment of the invention, the memory 32 is kept in a self-refresh mode until a packet arrives at the memory 32. That is, the memory 32 clocks are off but resumed when a memory controller senses data on the system bus 22. Then, the memory 32 is taken out of self-refresh. After the data has been stored in the memory 32, the memory 32 automatically reenters self-refresh. For example, after the system bus 22 has been idle for a predetermined period of time, the memory 32 enters the self-refresh mode.

An interesting packet is a packet of interest to the processor 10 but one that does not require immediate action. For example, an ARP (Address Resolution Protocol) request, an ICMP (Internet Control Message Protocol) ping, etc. When a first interesting packet is received and stored in the memory 32, a receive timer is started. The receive timer may be located in either the first network interface circuit 26, in a separate logic module such as the timer/counter module 34, or somewhere else in the processor 10. In one embodiment, the receive timer counts to the maximum amount of time it is permissible to defer responding to the first received packet. Once the receive timer reaches the maximum time, the wake-up interrupt is asserted. The receive timer may be a count up timer or a count down timer. The receive timer also preferably is programmable so that different values may be used for the timer depending on what is determined as the maximum available time to respond to the interesting packet. Further, more than one receive timer may be provided so that different packet types can have their own timer and different time values may be counted for such different packet types. This would accommodate the case where a first interesting packet is received that has a delay time for responding of 100 mS and if another interesting packet is received 5 mS later but the second interesting packet must be responded to within 50 mS. In this case, the second receive timer would assert the wake-up interrupt before the first receive timer finished counting to its maximum or otherwise programmed value. Once a wake-up interrupt is asserted, the timer and the counter are reset.

In addition to the receive timer, when an interesting packet is stored in the memory 32, a counter is incremented to keep track of how many interesting packets have been received. The counter preferably has a programmable threshold. When the threshold value is reached, then the wake-up interrupt is asserted.

Thus, the wake-up interrupt can be asserted if an immediately interesting packet is received, if the receive timer expires or if the counter reaches its threshold. Further, in a preferred embodiment, classification of packets as interesting, not interesting or immediate wake up is programmable. As discussed in more detail below, the wake-up interrupt also may be generated if a transmit timer expires.

Figure 2:
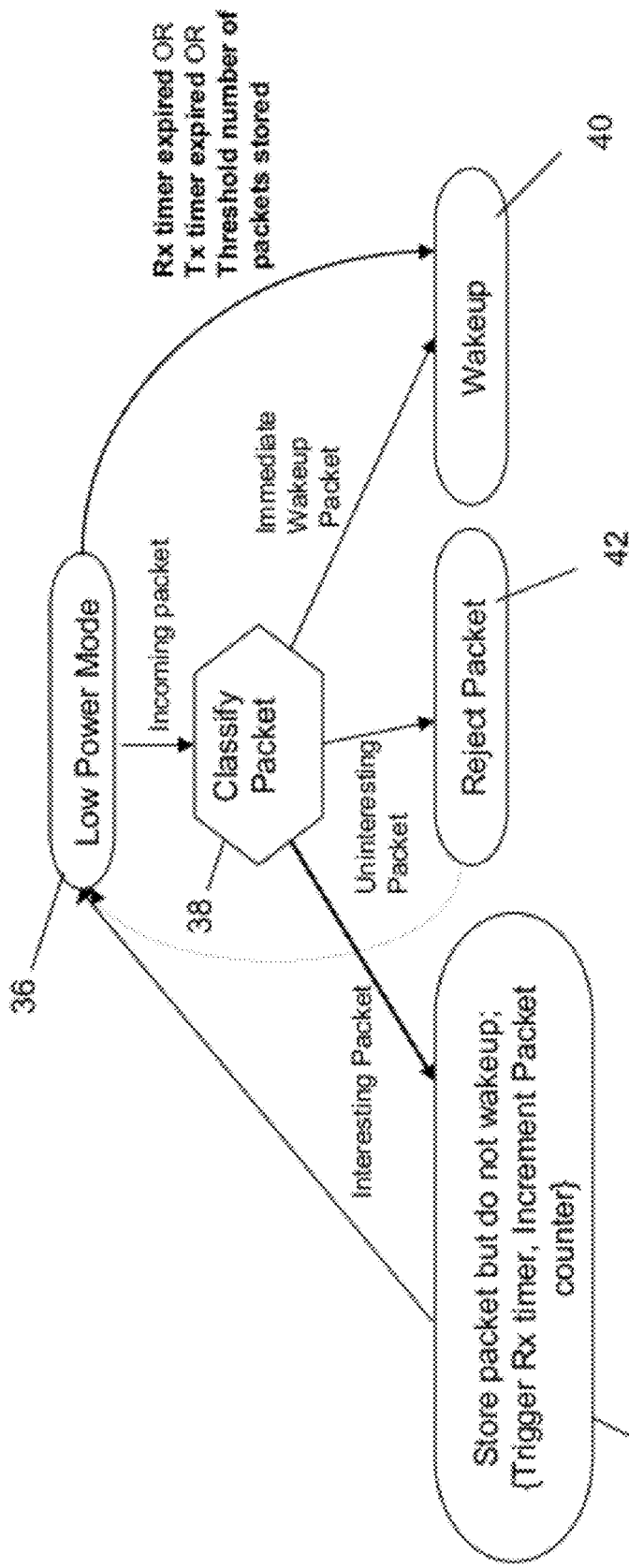
FIG. 2 is a state diagram illustrating the operations during a sleep mode of a processor in accordance with an embodiment of the present invention.

Referring now to FIG. 2, a state diagram illustrating operations of a networked processor during a low power mode is shown. A networked processor in the low power mode is indicated at 36. Although in the low power mode, the processor receives data packets transmitted over a network. As packets are received by the processor, the processor classifies the packet according to the packet type and its impact on the processor, as indicated at state 38. In one embodiment of the present invention, the received packets are classified as immediate wake-up packets, uninteresting packets, or interesting packets.

If the packet is classified as an immediate wake-up packet, the processor moves to a wake-up state 40. In the wake-up state 40, the processor will transition from sleep mode to active mode.

If the packet is classified as an uninteresting packet, the processor rejects or discards the packet as indicated at state 42 and remains in the low power mode 36.

If the packet is classified as an interesting packet then at state 44 the packet is stored, a stored packet counter is incremented (or decremented as the case may be if a decrementer is used instead of an incrementer) and if this is the first packet to be stored, a receive timer is triggered.

As shown in the drawing, the processor will move from the low power mode 36 to wake up state 40 if the receive timer expires, a transmit timer expires or the counter reaches a threshold value. That is, if the packet counter reaches a predetermined set value indicating that a threshold number of packets has been stored then a wake-up interrupt is generated and the processor will go to the wake-up state 40. The predetermined set value is set to a value that is somewhat less than a capacity of the buffer or memory space used to store the packets so that packets may still be received and stored while the processor is transitioning from the sleep state to the active state. Additionally, if the receive timer expires then the wake-up interrupt is generated and the processor moves to the wake-up state 40. As previously discussed, the receive timer is used to ensure that the processor responds to a received and stored packet within an expected response time. Further, if the transmit timer expires then the wake-up interrupt is generated. The wake-up timer is used to periodically wake-up the processor so that it may perform housekeeping tasks like transmitting a message over the network that the processor is still connected. Otherwise the processor remains in the low power mode 36.

Referring now to FIGS. 3A and 3B, timing diagrams illustrating the reception of data packets while in low power mode and waking up or transitioning from the low power mode to an awake or active mode are shown.

FIG. 3A illustrates that the use of only a timer to wake-up the processor is insufficient for all cases, such as when many packets are received before the timer expires. FIG. 3A illustrates a processor entering a low power mode and then receiving packets P(1) through P(N) and P(N+1) through P(M). After the first packet P(1) is received, a receive timer is activated. The timer counts the time until the processor must respond to the first packet P(1). Thus, the processor is permitted to remain in the low power mode and receive additional packets. N represents a number of packets that can be stored in a memory or buffer while the processor is in the low power mode. Thus, when P(N) packets have been received and stored, any later received packets may be lost. In this case, M packets are received and M>N, so packets P(N+1) to P(M)

are lost because the timer has not yet expired. The timer finally expires after the receipt of packet P(M), at which time the timer causes a wake-up interrupt to be asserted, which causes the processor to transition from the low power mode to an active or awake state.

FIG. 3B illustrates that the use of only a counter to wake-up the processor is insufficient for all cases, such as when many interesting packets are received over a relatively long period of time. FIG. 3B shows a processor entering a low power mode and then receiving packets P(1) through P(N). After the first packet P(1) is received, a counter is incremented. The counter counts the number of packets that the processor can store while in the low power mode. Thus, the processor is permitted to remain in the low power mode and still receive additional packets. N represents a number of packets that can be stored in a memory or buffer while the processor is in the sleep state. Thus, when P(N) packets have been received and stored, any later received packets may be lost. In this case, the packets are received slowly over a relatively long period of time. Thus, the time at which the processor should respond to the first packet expires before the maximum number (N) of packets has been received. More specifically, the timer expires after receipt of packet P(N−x). Thus, although the remaining packets P(N−y) to P(N) are received and stored, and the wake-up interrupt is asserted after N packets have been received, the processor has not timely responded to packet P(1).

Thus, according to the present invention, both a timer and a counter are used to assert the wake-up interrupt. Further, as for the counter, in an embodiment of the invention, the counter initiates a wake-up prior to receiving the maximum number of storable packets in order to accommodate for latency or the time it takes the processor to transition from the low power mode to the active mode.

An example of the power savings achievable by a processor according to an embodiment of the present invention will now be discussed. If a processor has the following parameters 100 mS to transition from low power mode
    10 mS to process one packet
    200 mW SoC power dissipation in low power mode
    4 W SoC power dissipation in active mode
    In an otherwise idle network, uninteresting packets arrive every 50 mS and interesting packets arrive every 1 s, but only require response every 60 s.

In a simple processor, i.e., in low power mode does not classify packets, low power mode is not entered because the time to wake up and process a packet exceeds the rate of arrival of a packet, so average power dissipation is 4 W.

In a processor that classifies packets but does not have the ability to accumulate (store) interesting packets for later processing, and so wakes up on receipt of an interesting packet, average power dissipation is: [60*(100 mS+10 mS)*4 W+(60−60*(100 mS+10 mS)*200 mW)/60]=0.618 W average.

In a processor that includes a receive timer and a counter in accordance with the present invention (packet classification and accumulation and wake only when a response is required every 60 S, average power dissipation is: [(100 mS+60*10 mS)*4 W+(60−(100 mS+60*10 mS)*200 mW)]/60)=0.244 W average.

Thus, a processor that includes the power management features of the present invention saves significantly more power than a processor that simply wakes up and responds to packets as they are received.

By now it should be appreciated that there has been provided a novel method of conserving power in a processor by allowing the processor to remain in a sleep mode and receive packets over a network, and also to be able to wake-up and then process the received packets. Storing packets rather than immediately waking up to process them allows the processor to sleep longer and thus conserve more power. The processor can receive multiple packets while asleep, store them, and upon waking up, process the packets as a group. The storing of packets and waking up if a threshold number of packets is received allows the processor to support traffic bursts even while in sleep mode without losing data. The storing of packets and waking up upon expiration of a receive timer allows the processor to sleep for a maximum time period. Thus, the present invention provides maximum power savings for lossless reception of network data whilst in sleep mode.

Although the invention is described herein with reference to specific embodiments, various modifications and changes can be made without departing from the scope of the present invention as set forth in the claims below. For example, more than one timer may be used, where the timers have different time values depending on the packet type. The counter may be a count-up or a count-down counter. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

What is claimed is:

1. A method of waking at least one processing unit of a processor, connected to a network, from a sleep mode, wherein the processor also includes a network interface circuit coupled to the processing unit and the network, the method comprising:

receiving a packet by the network interface unit by way of a network connection;

classifying the packet in accordance with predetermined categories, said predetermined categories including interesting and not interesting;

storing the received packet in a memory if the packet is classified as an interesting packet;

initiating a receive timer upon receipt of a first interesting packet;

incrementing a counter upon receipt of an interesting packet; and asserting a wake-up interrupt when at least one of said counter reaches a predetermined count value and said timer expires, wherein said wake-up interrupt instructs the processor to cause the at least one processing unit to transition from the sleep mode to an active mode, and wherein said predetermined categories includes an immediate wake-up category, and wherein if the received packet is classified as an immediate wake-up packet then said wake-up interrupt is asserted.

2. The method of waking a processor of claim 1, wherein the memory comprises a double data rate (DDR) type memory.

3. The method of waking a processor of claim 2, wherein the DDR memory is maintained in a self-refresh mode until a packet is to be stored in the DDR memory.

4. The method of waking a processor of claim 1, wherein the received packet is discarded if the packet is classified as not interesting.

5. The method of waking a processor of claim 1, wherein the classification of packets is programmable.

6. The method of waking a processor of claim 1, wherein an initial receive timer value and the predetermined count value are programmable.

7. The method of waking a processor of claim 1, wherein the wake-up interrupt also is asserted if a transmit timer expires.

8. The method of waking a processor of claim 1, wherein the received packet is an Ethernet data packet and is classified as interesting if the packet is one of a ping, ICMP, and ARP.

9. A processor connectable to a network for receiving packets of data transmitted over the network, wherein the processor includes an active mode and a sleep mode, the processor comprising:
- at least one processing unit that is powered down when the processor is in the sleep mode;
- a network interface circuit connectable to the network for receiving and classifying the data packets transmitted over the network while the processor is in the sleep mode, wherein the packets are classified as at least one of an interesting packet and an uninteresting packet;
- a memory coupled to the network interface circuit; a receive timer coupled to the network interface circuit; and
- a counter coupled to the network interface circuit; wherein if the received packet is classified as an interesting packet then the interesting packet is stored in the memory, the receive timer is initiated, and the counter is incremented; and
- wherein when at least one of the receive timer expires and the counter reaches a predetermined value then a wake-up interrupt is generated to wake up the at least one processing unit, and wherein a received packet also may be classified as an immediate wake-up packet in which case the wake up interrupt is generated to wake up the processor.

10. The processor of claim 9, wherein the memory is a double data rate (DDR) type memory.

11. The processor of claim 10, wherein the DDR memory is maintained in a self-refresh mode until a received packet is classified as an interesting packet and transmitted on a system bus to the DDR memory.

12. The processor of claim 9, wherein the received packet is discarded if the packet is classified as not interesting.

13. The processor of claim 9, wherein the receive timer is initiated only upon receipt of a first received packet that is classified as interesting.

14. The processor of claim 9, further comprising a transmit timer that is initiated when the processor enters the sleep mode and expires when the processor must transmit a data packet over the network, wherein upon expiration of the transmit timer the wake-up interrupt is generated.

15. A processor connectable to a network for receiving packets of data transmitted over the network, wherein the processor includes an active mode and a sleep mode, the processor comprising:
- at least one processing unit that is powered down when the processor is in the sleep mode;
- at least one cache coupled to the processing unit, wherein the cache is powered down when the processor is in the sleep mode;
- a network interface circuit connectable to the network for receiving and classifying the data packets transmitted over the network while the processor is in the sleep mode, wherein the packets are classified as at least one of an interesting packet, an uninteresting packet, and an immediate wake up packet;
- a memory coupled to the network interface circuit;
- a receive timer coupled to the network interface circuit; and
- a counter coupled to the network interface circuit,
- wherein if the packet is classified as an uninteresting packet, the packet is discarded,
- wherein if the packet is classified as an immediate wake-up packet a wake-up interrupt is asserted that causes the processor and the cache to transition from the sleep mode to the active mode,
- wherein if the received packet is classified as an interesting packet then the interesting packet is stored in the memory, the receive timer is initiated, and the counter is incremented, and wherein when at least one of the receive timer expires and the counter reaches a predetermined value then a wake-up interrupt is generated to wake up the at least one processing unit and the cache, and
- wherein a received packet also may be classified as an immediate wake-up packet in which case the wake up interrupt is generated to wake up the processor.

16. The processor of claim 15, further comprising a transmit timer that is activated when the processor enters the sleep mode.

* * * * *